United States Patent [19]
Androsov

[11] Patent Number: 5,657,631
[45] Date of Patent: Aug. 19, 1997

[54] INJECTOR FOR TURBINE ENGINES

[75] Inventor: Denis V. Androsov, Moscow, Russian Federation

[73] Assignee: B.B.A. Research & Development, Inc., Dodson, La.

[21] Appl. No.: 403,193

[22] Filed: Mar. 13, 1995

[51] Int. Cl.[6] .................................................. F02C 7/224
[52] U.S. Cl. ........................... 60/736; 60/737; 60/748; 239/403
[58] Field of Search ............................ 60/736, 737, 740, 60/743, 748; 239/135, 399, 403, 432, 433

[56] References Cited

U.S. PATENT DOCUMENTS

| | | | |
|---|---|---|---|
| 2,404,335 | 7/1946 | Whittle | 60/748 |
| 2,667,919 | 2/1954 | Pardee et al. | 60/736 |
| 2,771,744 | 11/1956 | Johnson et al. | 60/743 |
| 3,483,699 | 12/1969 | Harvey | 60/737 |
| 3,657,885 | 4/1972 | Bader | 60/737 |
| 3,912,164 | 10/1975 | Lefebvre et al. | 60/743 |
| 3,955,361 | 5/1976 | Schirmer et al. | 60/736 |
| 4,321,794 | 3/1982 | Etheridge | 60/748 |
| 5,121,608 | 6/1992 | Willis et al. | 60/743 |
| 5,473,881 | 12/1995 | Kramnik et al. | 60/737 |

*Primary Examiner*—Michael Koczo
*Attorney, Agent, or Firm*—John M. Harrison

[57] ABSTRACT

An injector for turbine engines which includes a shaped injector core fitted with an eccentric spinner inlet communicating with a cylindrical, annular fuel spinner chamber and a preheater or evaporator for preheating and vaporizing fuel, wherein the vaporized fuel is eccentrically injected into the fuel spinner chamber to effect a spinning fuel sequence around a fuel guidance pin extending through the center of the fuel spinner chamber. Compressed air from the turbine compressors flows through the primary nozzle of an air guidance nozzle surrounding the injector core into a shaped secondary nozzle, where the air mixes with the spinning fuel at a selected air flow angle to facilitate thorough mixing of the fuel and air as the combustible mixture is channeled into the annular turbine combustor. The unique spinning component applied to the preheated, vaporized fuel and manner of introducing the compressed air into the spinning fuel using multiple, spaced injectors and corresponding air guidance nozzles effects exceptionally good air-fuel mixing and facilitates increased turbine operating efficiency and reduction of NOX emissions in the turbine exhaust gases.

8 Claims, 4 Drawing Sheets

INJECTOR FOR TURBINE ENGINES

BACKGROUND OF THE INVENTION

Field of the Invention

This invention relates to techniques for improving the efficiency of turbine engines and reduction of noxious components in the turbine exhaust gases. More particularly, the invention relates to a new and improved injector for turbine engines, which injector is characterized in a preferred embodiment by a shaped injector core fitted with an eccentric spinner inlet nozzle communicating with a cylindrical, annular spinner chamber, and a preheater or evaporator for preheating fuel and injecting the vaporized fuel at a selected temperature into the fuel spinner chamber through the eccentrically-positioned fuel spinner nozzle or opening, to effect a spinning fuel sequence around a fuel guidance pin extending through the fuel spinner chamber. Compressed air from the turbine compressors flows through the primary nozzle of an air guidance nozzle enclosing each injector core, into a shaped secondary nozzle and mixes with the spinning fuel in a flow focus zone at a selected mixing air flow angle to facilitate thorough and homogeneous mixing of the fuel as it is channeled into the annular turbine combustor. The unique spinning component applied to the preheated, vaporized fuel by the several injectors and the manner of introducing air into the spinning fuel from the respective secondary nozzles of the air guidance nozzles effects surprisingly good air-fuel mixing and facilitates excellent engine operating efficiency and reduction of undesirable "NOX" emissions in the turbine exhaust gases.

One of the problems which is arising in ever-increasing significance is that of noxious, air-polluting components in the exhaust gases of turbine engines, including jet airplane engines and such equipment as stationary engines, typically turbine-operated generators, pumps and refrigeration turbine engines, as well as other engines and systems utilizing fuel injecting equipment. Solutions to this problem have included both wet and dry "NOX" control techniques which are well known to those skilled in the art, for the purpose of lowering undesirable turbine exhaust gas emissions. These emissions are hereinafter collectively referred to as NOX and include such ingredients such as carbon monoxide, nitrogen dioxide and the like, and in light of current pollution control standards, new and improved techniques for reducing these undesirable NOX emissions from turbine and other system exhaust gases is necessary. The conventional use of wet NOX and dry NOX techniques for achieving this result require heavier and more complex turbine equipment and are therefore counterproductive in many installations, including aircraft, as well as industrial and other applications.

Accordingly, it is an object of this invention to provide a new and improved injector for turbine engines of various design, which injector not only increases the efficiency of the turbine engine with no increase in weight or complexity, but also reduces the emission of noxious, air-polluting components (NOX) from the turbine exhaust.

Another object of this invention is to provide a new and improved injector for turbine engines and other engines and systems utilizing fuel injection equipment of various design, which injector is characterized by an injector core shaped to define an internal, curved, annular fuel spinner chamber having a centrally-projecting fuel guidance pin to facilitate spinning of fuel vapor introduced into the fuel spinner from an evaporator through an eccentrically-positioned spinner inlet, such that a spiral of spinning, preheated and vaporized fuel is created in the fuel spinner chamber and mixes with incoming compressed air from the turbine compressors or alternative air source at a selected mixing angle to effect a surprisingly complete and homogeneous mixture of air and fuel channeled to the turbine or engine combustor system.

Still another object of this invention is to provide new and improved injectors for turbine engines, a selected design number of which injectors can be retrofitted to the annular combustion of existing turbine engines, as well as provided on new turbine engines and each injector including an air guidance nozzle enclosing a tapered injector core having an internal cylindrical, annular fuel spinner chamber defined around an outwardly-projecting fuel guidance pin having an enlarged end or tip, wherein preheated, vaporized fuel from a heat exchanger enters the fuel spinner chamber through an eccentrically-oriented spinner inlet to facilitate a spiral rotation of fuel in the annular fuel spinner chamber around the fuel guidance pin and from the fuel spinner chamber, guided by the fuel guidance pin tip, into an inwardly-directed, continuous, compressed air stream flowing through the corresponding air guidance nozzle, to create a significantly homogeneous, stoichiometric mixture of fuel and air prior to entrance of the combustible mixture into the annular turbine combustor.

SUMMARY OF THE INVENTION

These and other objects of the invention are provided in new and improved injectors for mounting in radially spaced relationship with respect to each other on the annular combustors of turbine engines, each of which injectors is characterized in a preferred embodiment by a shaped metal, ceramic or ceramic-coated injector core located in an air guidance nozzle, wherein compressed air from the turbine compressors is caused to flow between each injector core and the corresponding air guidance nozzle in inwardly-directed relationship to mix at a selected mixing angle with vaporized fuel introduced into a cylindrical fuel spinner chamber shaped in the injector core, through an eccentrically-located spinner inlet. The fuel is preheated as a vapor or vaporized in an evaporator or heat exchanger and is thus introduced along a selected chord of the circle defining the fuel spinner chamber and against the curved cylindrical wall of the fuel spinner chamber perpendicular to the longitudinal axis of the injector core, to impart a spinning and spiralling rotation of the fuel around a centrally-projecting fuel guidance pin that extends through the fuel spinner chamber, to mix with the air and create a significantly homogeneous, stoichiometric mixture of fuel and air, which is then delivered by the air stream to the annular combustor. This homogeneous mixing of preheated and vaporized fuel and air by the spiralling movement of the fuel into the air stream both increases the efficiency of the turbine and reduces the emission of NOX in the turbine exhaust gases.

BRIEF DESCRIPTION OF THE DRAWINGS

The invention will be better understood by reference to the accompanying drawings, wherein.

DESCRIPTION OF THE PREFERRED EMBODIMENTS

Figure 1:
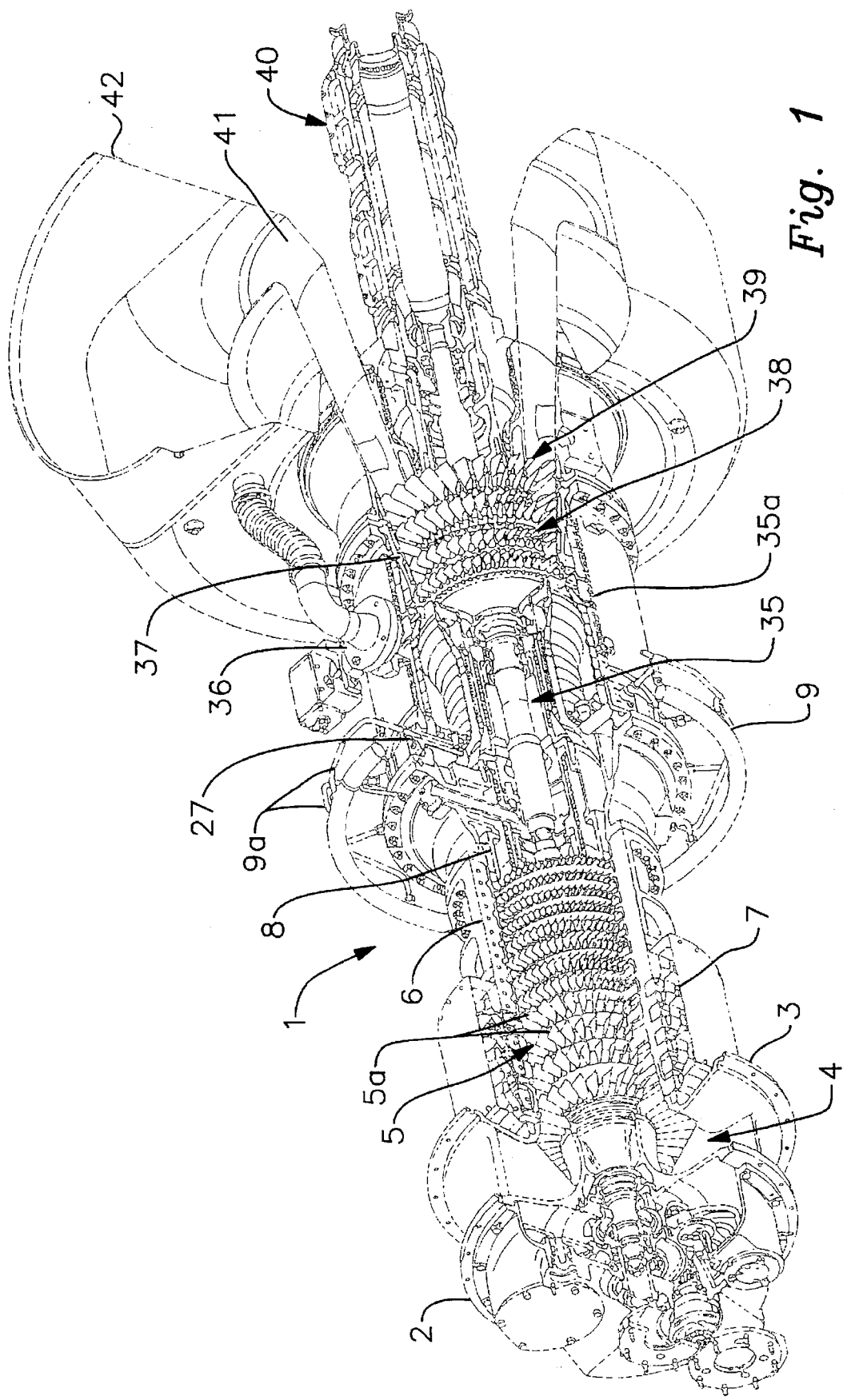
FIG. 1 is a perspective view, partially in section, of a typical conventional gas turbine engine.
Figure 2:
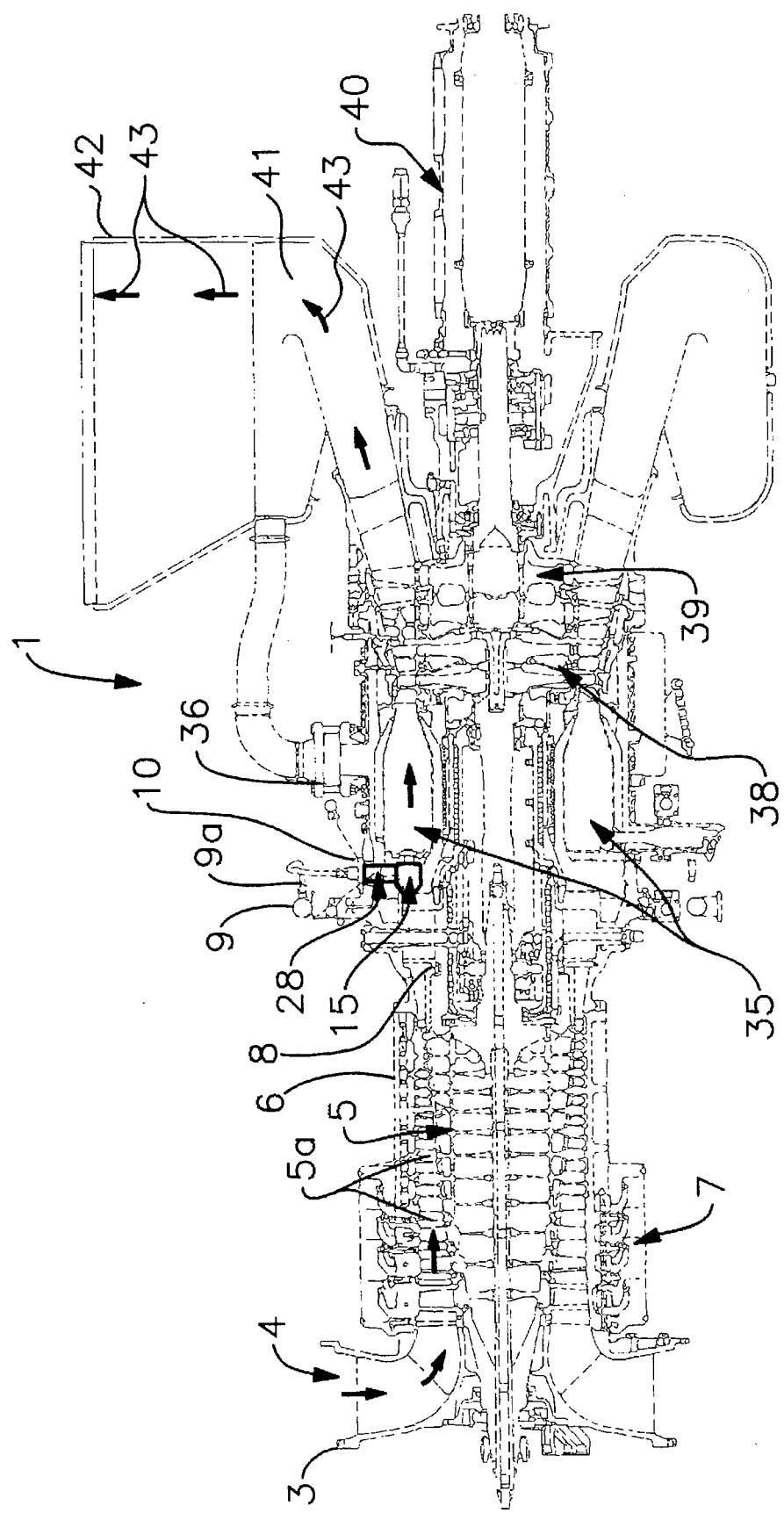
FIG. 2 is a sectional view of the gas turbine engine illustrated in FIG. 1, illustrating an injector of this invention installed therein.

Referring initially to FIGS. 1 and 2 of the drawings, a conventional turbine engine which is typical of the turbine engines in which the injectors of this invention may be mounted, is illustrated by reference numeral 1. The turbine engine 1 is characterized by an accessory drive assembly 2, which may be connected to various equipment such as a compressor, propeller or the like, for doing useful work. An air inlet assembly 3 is illustrated at the front of the turbine engine 1 and facilitates a flow of ambient air 4 into the turbine engine 1. The air 4 passes through a compressor rotor 5, which is fitted with multiple, radially-extending rotor blades 5a, located in a compressor case 6. A compressor variable vane assembly 7 extends from the compressor case 6 radially outwardly of the compressor rotor 5, as illustrated. A compressor diffuser 8 is provided on the inboard end of the compressor case 6 and a gas fuel manifold 9 encircles the combustor housing 35a, which encloses the annular combustor 35. Fuel lines 9a serve to channel fuel from the circular gas fuel manifold 9 to the conventional fuel injector 27, illustrated in FIG. 1, and identified by reference numeral 10 in FIG. 2, as a fuel injector of this invention. A bleed air valve 36, nozzle case 37, gas producer turbine rotor 38, power turbine rotor 39, output drive shaft assembly 40, turbine exhaust diffuser 41 and exhaust collector 42 complete the major components of the conventional, illustrative turbine engine 1 illustrated in FIGS. 1 and 2 of the drawings.

Figure 3:
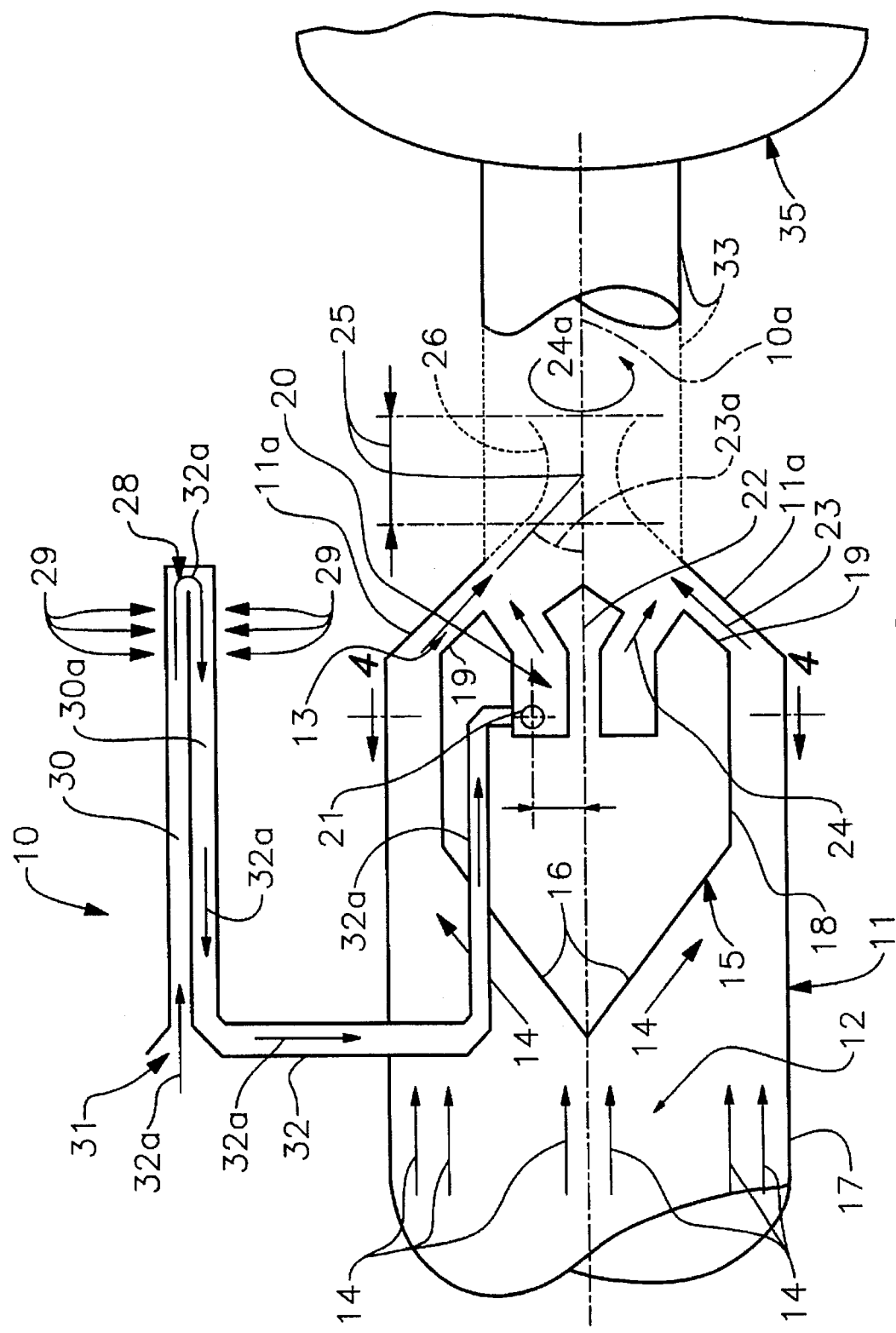
FIG. 3 is a sectional, partially schematic view of a preferred embodiment of the injector of this invention.
Figure 4:
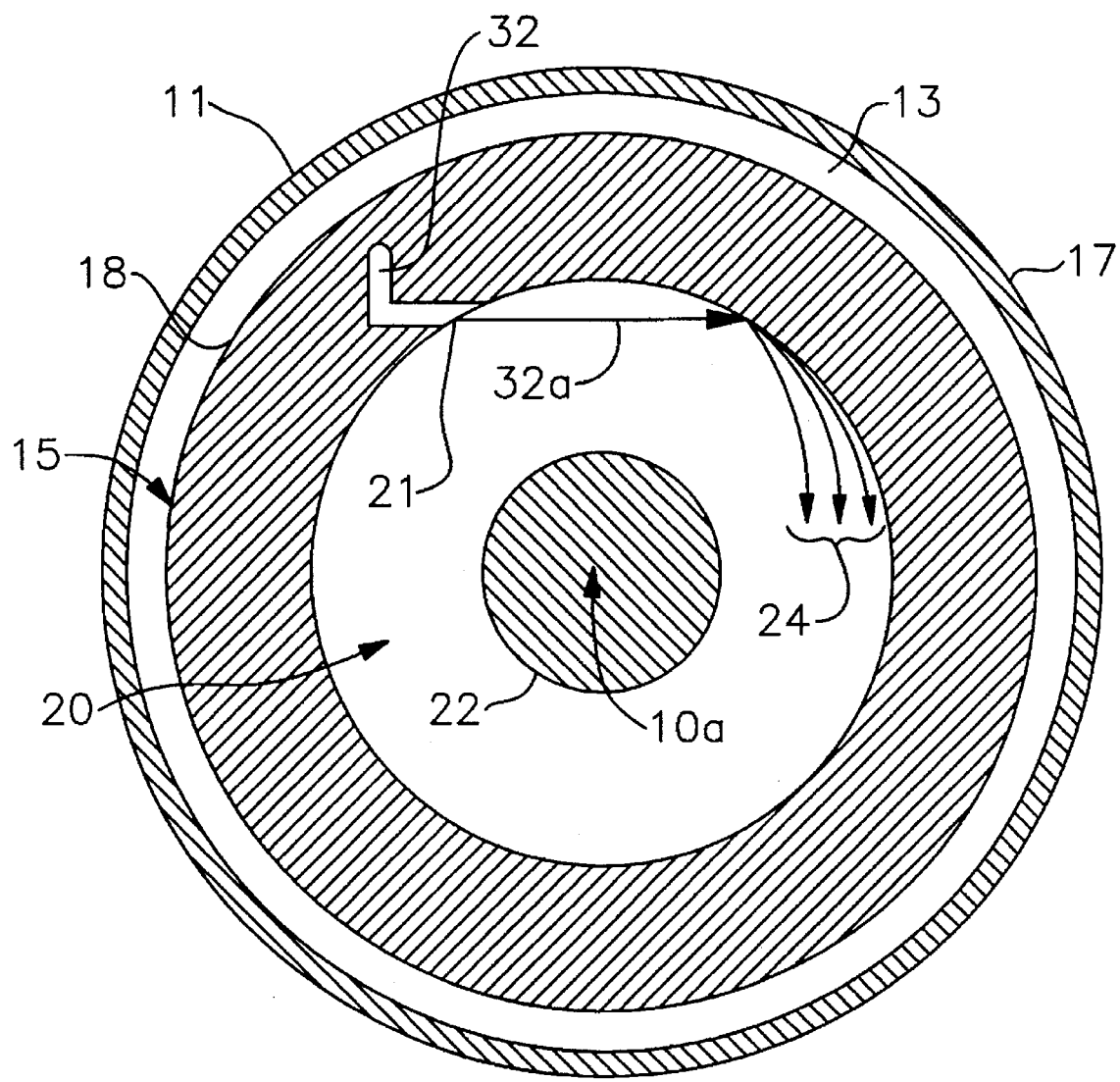
FIG. 4 is a sectional view, taken along line 4—4 of the air guidance nozzle and injector core elements of the fuel injector illustrated in FIG. 3.

Each one of the multiple fuel injectors 10 of this invention is more particularly illustrated in FIGS. 2-4 of the drawings and includes a cylindrical air-guidance nozzle 11, illustrated in FIGS. 3 and 4, having a cylindrical nozzle housing 17 which is symmetrical about a longitudinal axis 10a and terminates in a nozzle bevel 11a. The air-guidance nozzle 11 includes a primary nozzle chamber 12, which receives compressed air from the compressor rotor 5 illustrated in FIGS. 1 and 2, and a secondary nozzle chamber 13, which channels and directs the compressed air from the primary nozzle chamber 12 into an annular, converging stream. The compressed air flow from the compressor rotor 5 is indicated by the arrows 14 in the primary nozzle chamber 12 and by the arrows 23, as a mixing air flow, in the secondary nozzle chamber 13, as shown in FIG. 3. An injector core 15, having a cylindrical core wall 18, is disposed inside each cylindrical air guidance nozzle 11 and is also symmetrical about each longitudinal axis 10a, to define the secondary nozzle chamber 13. That portion of the injector core 15 which faces the incoming compressed air flow 14 is most preferably characterized by a core taper 16, shaped to channel the compressed air flow 14 around the injector core 15 and into the inwardly-directed secondary nozzle chamber 13 to define the mixing air flow 23, as illustrated in FIG. 3. A wall bevel 19 encircles the opposite end of the injector core 15 from the core taper 16 and parallels the nozzle bevel 11a of the air guidance nozzle 11 to further define the secondary nozzle 13. An internal, cylindrical, annular fuel spinner chamber 20 is provided in the injector core 15 opposite the core taper 16 and receives an outwardly-extending, centrally-positioned fuel guidance pin 22, having an enlarged, flared end 22a, which is also symmetrical about the longitudinal axis 10a of each fuel injector 10. As further illustrated in FIGS. 3 and 4, a spinner inlet 21 is eccentrically provided in the curved wall of the cylindrical, annular injector core 15 and communicates with a fuel flow line 32, extending from an evaporator 28, hereinafter further described. Accordingly, fuel 32a which is injected into the annular space between the circular fuel spinner chamber 20 and the fuel guidance pin 22 from the eccentrically-oriented spinner inlet 21 is injected along a chord of the circle defining the spinner chamber 20, directly against the curved wall of the cylindrical fuel spinner chamber 20, thereby imparting a spinning component to the entering fuel, which has been preheated by heat exchange in the evaporator 28, as further hereinafter described. The spinning, vaporized and preheated fuel is identified by reference numeral 24 and the spinning fuel 24 spirals from the point of impingement in the spinner chamber 20, annularly around the fuel guidance pin 22 as illustrated in FIG. 4, to diffuse in the converging mixing air flow 23 flowing from the secondary nozzle chamber 13 at the wall bevel 19 of the core wall 18, in a flow focus zone 25, as illustrated in FIG. 3 and as further hereinafter described.

Referring again to FIGS. 3 and 4 of the drawings, the evaporator 28 is characterized by a first pass chamber 30 and a second pass chamber 30a, which direct the fuel 32a from the fuel inlet 31 through the evaporator 28. Application of external heat 29 from the combustor 35 of the turbine engine 1 vaporizes the incoming fuel 32a if it is introduced as a liquid and preheats the vaporized fuel 32a to the point of entry into the cylindrical, annular fuel spinner chamber 20, through the spinner inlet 21. Accordingly, the fuel 32a is preheated and vaporized when it exits the spinner inlet 21 and begins its spiralling annular flow as the spinning fuel 24 around the fuel guidance pin 22 and flared end 22a, into the mixing air flow 23, as heretofore described and illustrated.

In operation, liquid or gaseous fuel 32a from a suitable storage tank (not illustrated) is introduced into the gas fuel manifold 9 illustrated in FIGS. 1 and 2 and is continuously pumped from the gas fuel manifold 9 through the fuel lines 9a and into the fuel inlet 31 of the evaporator 28, illustrated in FIG. 3. Typical fuels which may be handled by the fuel injector 10 of this invention include methane, butane, propane, kerosene, alcohol, acetone, hydrogen and fluidized charcoal dust, in nonexclusive particular. If the fuel 32a is liquid when it enters the fuel inlet 31, it is quickly vaporized by application of the external heat 29 to the first pass chamber 30 and second pass chamber 30a. If gaseous fuel 32a is introduced into the fuel inlet 31, it is preheated to the desired injection temperature and in both cases, the fuel 32a exits as a preheated vapor at the spinner inlet 21 into the cylindrical, annular fuel spinner chamber 20. As illustrated in FIG. 4, the vaporized fuel 32a is directed longitudinally normal to the longitudinal axis 10a, along a chord of the circle defined by the circular fuel spinner chamber 20, against the curved wall of the fuel spinner chamber 20 and a spiralling spin having a fuel spinning velocity 24a, is thus imparted to the vaporized and preheated spinning fuel 24 as it rotates in the annular fuel spinner chamber 20, around the centrally-located and extending fuel guidance pin 22. The fuel spinning velocity 24a is a function of the speed of rotation of the vaporized fuel 32a and the diameter of the fuel spinner chamber 20. Accordingly, this spinning fuel 24 continuously spins toward the compressed mixing air flow 23, which continuously flows through the secondary nozzle chamber 13 at a selected mixing air flow angle 23a, measured with respect to the longitudinal axis 10a and is directed inwardly by the wall bevel 19 of the injector core 15 and the nozzle bevel 11a of the air guidance nozzle 11. The mixing air flow angle 23 typically ranges from 0 degrees to about 90 degrees, depending upon application. The enlarged, flared tip or end 22a of the fuel guidance pin 22 directs the spinning fuel 24 into the mixing air flow 23 at a desired angle, preferably about 80 to 90 degrees, in a flow focus zone 25 and the spinning fuel 24 is quickly and efficiently diffused into the mixing air flow 23 to create an extremely homogeneous, highly combustible stoichiometric air/fuel mixture 26 in the flow focus zone 25, carried into the combustor inlet 33 of the combustor 35 by an excess of air in the mixing air flow 23, where it is ignited in conventional fashion. Accordingly, the rotational spin imparted to the preheated, vaporized, spinning fuel 24, coupled with the inwardly-directed compressed mixing air flow 23 to thoroughly and homogeneously mix the fuel and air, effects combustion which facilitates optimum turbine engine operating efficiency and minimum discharge of NOX in the exhaust gases 43 emitted from the exhaust collector 42 of the turbine engine 1. This elevation of turbine engine efficiency and reduction of NOX is therefore effected by more efficient mixing and burning of the fuel with an excess of air to produce thorough, stoichiometric burning and minimum emission of undesirable exhaust components such as carbon monoxide.

It will be appreciated by those skilled in the art that the evaporator 28 is illustrated in FIG. 3 as a double-pass heat exchanger for purposes of illustration only. Accordingly, a multiple-pass or even a single-pass heat exchanger may be used to characterize the evaporator 28, according to the knowledge of those skilled in the art, depending upon the temperature and character of the incoming fuel 32a entering the fuel inlet 31. For example, if the fuel 32a entering the fuel inlet 31 is liquid at a low temperature, appropriate external heat 29 will be applied to the evaporator 28 and the evaporator 28 must be designed with the appropriate number of pass chambers to effectuate entry of an appropriately evaporated and preheated fuel 32a at the spinner inlet 21 of the injector core 15. Under circumstances where the incoming fuel 32a is already vaporized and is at a higher temperature, minimum application of external heat 29 and a single pass such as a first pass chamber 30 only, may be necessary in the evaporator 28 to effect the desired injection temperature at the spinner inlet 21. Furthermore, it will be further understood that the size of the nozzle housing 17 and internal injector core 15, including the secondary nozzle chamber 13, as well as the dimensions of the fuel spinner chamber 20 and fuel guidance spin 22 and flared end 23 and the other components of the fuel injector 10, may be varied and sized according to the dimensions of the turbine engine 1 in which the fuel injectors 10 are installed and used. Moreover, a selected number, typically 9 or 10, of fuel injectors 10 may be installed in annular, circumferentially-spaced fashion around the annular combustor 35, according to design requirements for the respective turbine engine 1. Also, various types of pumps, accessory equipment and the like, may be used in connection with the fuel injectors 10 to supply either liquid or gaseous fuel to the evaporator 28, according to the knowledge of those skilled in the art. It will be further appreciated that the fuel injectors 10 may be retrofitted to existing turbine engines and installed in new turbine engines, as desired.

The fuel injectors 10 of this invention may also be installed on burner systems and engines of non-turbine design. Since the application of one or more fuel injectors 10 operates to more efficiently disperse preheated, vaporized fuel into a directionally-controlled air stream, this application can be made to internal combustion engines, including reciprocating and rotary engines, as well as boiler systems and other systems requiring injection of fuel into a combustor or combustion chamber of various design and description. In any such engine or burner system, regardless of size, complexity or design, one or more of the injector cores and air guidance nozzles illustrated in FIGS. 2–4 may be mounted in the engine or burner at or near the combustion chamber. And a blower, or other air delivery system may be used to move air around the injector core through the air guidance nozzle, or, in the alternative, around the injector core in the angular relationship described above with respect to the longitudinal axis of the injector core, to create the desired stoichiometric mix of air and fuel for combustion and achieve the intents and purposes of the invention.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A fuel injector for injecting fuel into the combustor of a turbine engine, said fuel injector having a longitudinal axis and comprising an air guidance nozzle provided in the turbine engine, injector core means positioned inside said air guidance nozzle to define an annular air space for channeling a stream of air through said fuel injector, a cylindrical fuel spinner chamber provided in said injector core means and a fuel spinner inlet provided in said injector core means, said fuel spinner inlet positioned substantially normal to the longitudinal axis of said fuel injector and communicating with said fuel spinner chamber; a fuel guidance pin provided in said fuel spinner chamber for directing the fuel into the stream of air from said air guidance nozzle; and evaporator means communicating with said fuel spinner inlet for receiving the fuel and preheating the fuel prior to injection of the fuel into said fuel spinner chamber through said fuel spinner inlet, whereby preheated fuel is injected into said fuel spinner chamber from said fuel spinner inlet and the fuel is caused to spin around said fuel spinner chamber and said fuel guidance pin in a substantially homogenous mass and mix with the stream of air from said annular air space to form a combustible mixture for igniting and operating the turbine engine.

2. The fuel injector of claim 1 comprising an enlargement provided on said fuel guidance pin for directing the fuel from said fuel spinner chamber into the stream of air from said air guidance nozzle at a selected angle with respect to said fuel guidance pin.

3. A fuel injector for injecting fuel into a stream of air flowing through a turbine engine, said fuel injector comprising an air guidance nozzle; an injector core located in said air guidance nozzle; an annular air flow chamber defined by said air guidance nozzle and said injector core, said annular air flow chamber converging to define an air-fuel mixing zone, said injector core having a substantially cylindrical fuel spinner chamber and a fuel spinner inlet provided in said injector core for injecting fuel through said fuel spinner inlet into said fuel spinner chamber along a cord of a circle defined by said fuel spinner chamber and imparting a rotation or spin to the fuel; and a fuel guidance pin centrally provided in said fuel spinner chamber for guiding the fuel from said fuel spinner chamber around said fuel guidance pin into the stream of air, whereby the stream of air flows through said annular flow chamber into said mixing zone and the fuel flows from said spinner chamber around said fuel guidance pin into the mixing zone and thoroughly mixes with the stream of air to form a substantially stoichiometric combustible fuel-air mixture.

4. The fuel injector of claim 3 comprising evaporator means communicating with said fuel spinner inlet for receiving the fuel and preheating the fuel prior to injection of the fuel into said fuel spinner chamber through said fuel spinner inlet.

5. The fuel injector of claim 3 comprising an enlargement provided on said fuel guidance pin for directing the fuel from said fuel spinner chamber into the stream of air at a selected angle with respect to said fuel guidance pin.

6. Fuel injectors for injecting fuel into an air stream flowing into the combustor of a turbine engine, each of said fuel injectors having a longitudinal axis and comprising a substantially cylindrical air guidance nozzle having a nozzle taper; an injector core having a core taper adjacent to said nozzle taper, said injector core positioned inside said air guidance nozzle, to define an annular air flow chamber between said air guidance nozzle and said injector core, said air flow chamber converging at said nozzle taper and said core taper to define an air-fuel mixing zone; a substantially cylindrical fuel spinner chamber provided in said injector core, a fuel guidance pin centrally provided in said fuel spinner chamber and a fuel spinner inlet provided in said injector core, said fuel spinner inlet communicating with said fuel spinner chamber normal to the longitudinal axis of said fuel injector, whereby fuel is eccentrically injected into said fuel spinner chamber from said fuel spinner inlet and the fuel is caused to spin around said fuel spinner chamber and said fuel guidance pin and mix with the stream of air from said air flow chamber in said air-fuel mixing zone to form a combustible mixture for entry into the combustor.

7. The fuel injectors of claim 6 comprising an enlargement provided on said fuel guidance pin for directing the fuel from said fuel spinner chamber into the stream of air from said air guidance nozzle at a selected angle with respect to said fuel guidance pin.

8. The fuel injectors of claim 6 comprising evaporator means communicating with said fuel spinner inlet for receiving the fuel and preheating the fuel prior to injection of the fuel into said fuel spinner chamber through said fuel spinner inlet.

* * * * *